Patented Aug. 25, 1942

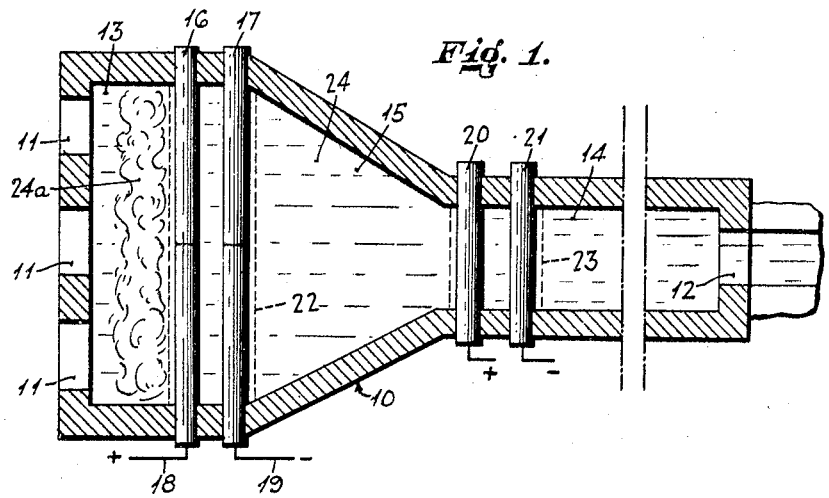

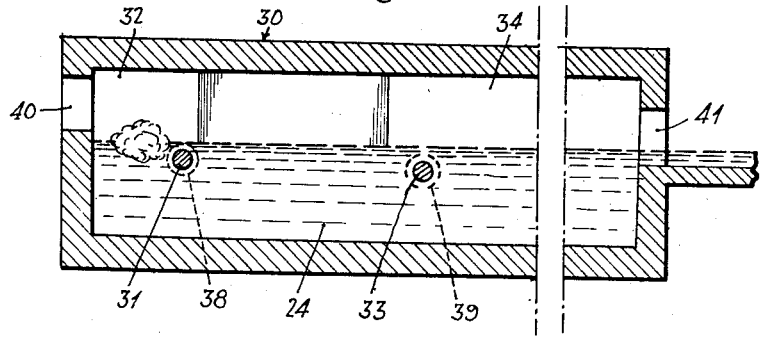
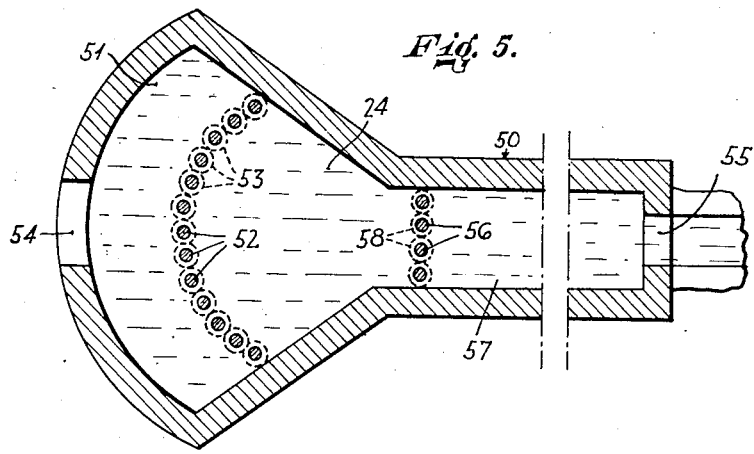
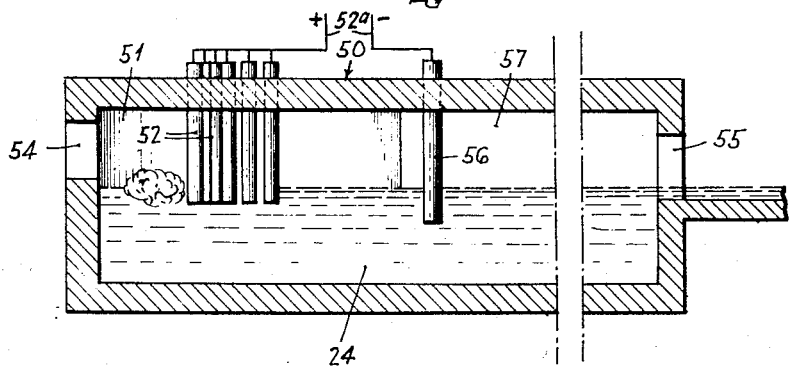

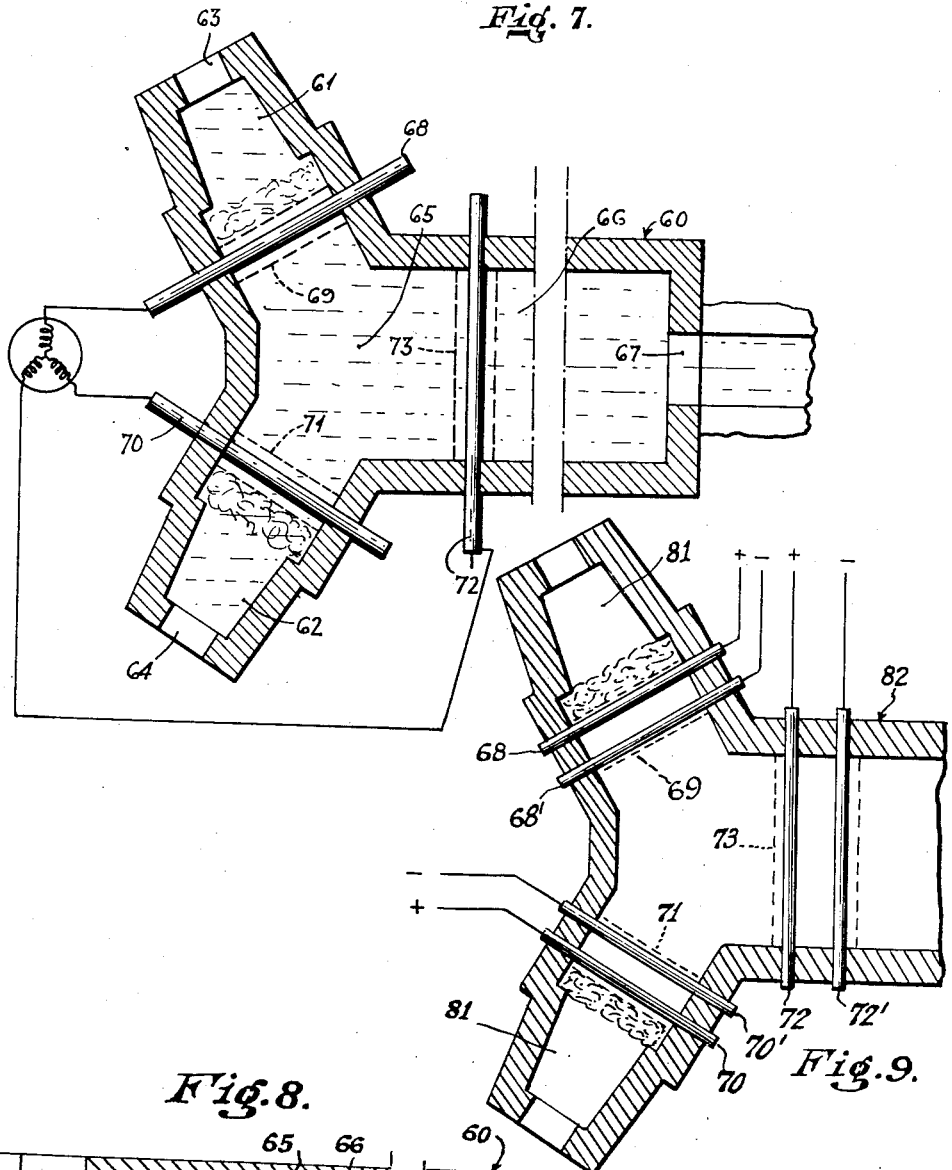
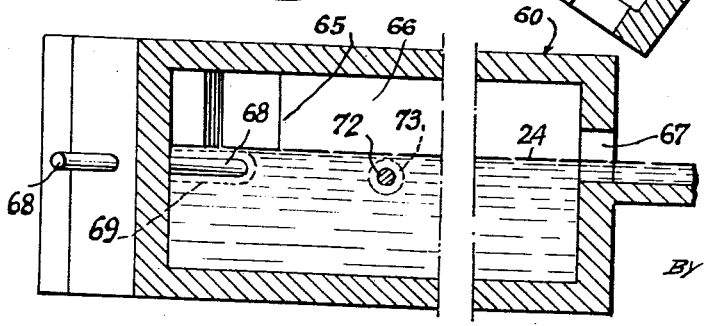

2,293,948

UNITED STATES PATENT OFFICE 2,293,948

MEANS FOR MANUFACTURING GLASS

Yvan Peyches, Paris, France, assignor to Societe Anonyme des Manufactures des Glaces & Produits Chimiques de Saint-Gobain, Chauny & Cirey, Paris, France, a corporation of France Application September 15, 1939, Serial No. 295,029
In France September 17, 1938

17 Claims. (Cl. 13—6)

This invention relates to a method and means for manufacturing glass, and refers more particularly to tank furnaces for glass in which the heating is effected by the Joule effect of an electrical current flowing through the glass mass within the tank furnace. The invention is particularly concerned with that type of electric furnace wherein a glass mass flows from the charging end to the withdrawing end of the furnace and is melted and fined in the course of its flow, and wherein electrodes are placed within the flow of the glass mass and across the direction of that flow to form hot zones extending transversely to the glass flow and across substantially the entire width of the furnace.

Such furnaces are described in greater detail in Edouard V. Borel Patent No. 2,225,616, issued December 24, 1940.

Furnaces of this type are usually required to perform two operations, namely, to heat and melt raw materials required for the making of the glass and then to fine the glass which is thus produced by heating it to a higher temperature. The expression "glass mass" is used throughout this specification and claims to describe various substances of different state and composition in the course of their flow through the furnace and their treatment within the furnace, including materials, molten but unfined glass, and fined glass.

The glass mass is heated by hot zones which are obtained either by placing two electrodes of opposed polarity comparatively close to each other so that the current flowing through the glass mass situated between these electrodes creates a hot zone, or by using at least one electrode having a surface in contact with the glass mass that is small as compared to the cross-section of the glass mass between that electrode and an adjacent one. The density of the electrical current is then quite great close to the electrode, so that large amounts of heat are produced in a zone around the electrode.

It is obvious that whenever substances which are in a more or less powdery state are introduced into a furnace for the purpose of being melted into a homogeneous mass which is later fined to make clear glass, the hot zone or zones through which the glass mass flows in the course of the melting do not treat substances which are all identical as to their state, since a zone located closer to the inlet of the furnace will treat substances which are heterogeneous, lighter than the remainder of the glass bath, and more or less opaque to calorific rays, while the hot zones which are farther removed from the inlet act on glass which is in a substantially homogeneous state and is nearly transparent.

Consequently, the zone or zones nearest to the inlet of the furnace have a much smaller range of action upon the glass mass than the other hot zones. As a consequence, the electrodes which produce a hot zone or zones in the melting portion of the furnace are preferably placed close to the surface of the glass mass so that the hot zone is localized close to the surface on which the lighter raw or partly melted material floats, thereby providing heat where it is most needed. Electrodes so placed have the further advantage that they form an obstacle to the passage past them of the raw or partly melted material, thus retaining this material in the melting zone until it has become fully melted. The rate of flow of glass in this part of the furnace becomes slower but this reduction of speed may have the disadvantage of reducing the melting capacity of the furnace in comparison with its fining capacity, and such disturbance of balance results in a reduction of the total thermic efficiency of the furnace. On the other hand, it is essential for the purpose of manufacturing homogeneous glass that the raw substances which are lighter than the glass mass be vitrified as soon as possible and before they are distributed throughout the glass mass.

One of the objects of the present invention is to provide a tank furnace which is so constructed that the heating zone portion or portions in the part of the furnace wherein fusion takes place has a melting capacity substantially equal to the fining capacity of the fining portion of the furnace, whereby the thermic efficiency of the furnace is increased.

Another object of the present invention is the provision of a method and means for manufacturing glass wherein the heat required for this purpose is utilized to the best possible advantage and at a minimum loss.

Other objects of the present invention will become apparent in the course of the following specification.

The objects of the present invention may be realized by providing a heating zone or melting zone for melting purposes, which is wider than the heating zone utilized for fining the molten glass mass. This may be accomplished by arranging an electrode or electrodes in the melting portion of the furnace in such manner as to form a hot zone or zones close to the surface of the glass mass and extending across the width of the furnace, the width of this hot zone or zones in the melting portion of the furnace as measured across the width of the furnace, being substantially greater than that of the hot zone or zones in the fining portion of the furnace, the last-mentioned hot zone or zones, also extending across the width of the furnace and being also produced by an electrode or electrodes which is or are situated in this fining portion of the furnace.

As already stated, the hot zones may be produced by pairs of electrodes of opposite polarity a short distance apart, so that the energy supplied by the electrodes is expended in heating a small mass of glass, or each zone may be produced by a single electrode the area of which in contact with the glass mass is sufficiently small.

The electrode or electrodes constituting the hot zone or zones used for melting purposes may be placed very close to the surface of the glass mass. Then this electrode or electrodes will heat directly the unmolten light substances floating on the surface of the glass mass and will facilitate their melting.

In that part of the furnace wherein hot zone or zones are used to fine molten glass, the entire bath is in a melted state and the differences in the density of the various portions thereof are comparatively small and, in any event, much smaller than the differences existing between the density of the melted bath and the density of the unmelted materials in the melting part of the furnace. Therefore, it is advisable to arrange the electrode or electrodes used for the fining of the glass mass substantially deeper below the level of the glass bath than the electrodes used for melting purposes. However, as a result of the more uniform density of the bath in the refining part of the furnace, convection currents can easily bring glass into the hot zone from all levels of the bath irrespective of the depth of the electrodes. In the melting part of the furnace the materials to be melted are localized in a layer of relatively small thickness at the surface of the bath so that a similar localization of the hot zone is most desired, whereas in the refining part of the furnace there is no such localization of the materials to be refined.

By using a wider hot zone for melting purposes the tank furnace may be made smaller in width in the fining zone than in the fusion zone without diminishing the fining capacity in relation to the fusing capacity. This, on the other hand, diminishes heat losses caused by the vaults and other parts of the furnace and increases its thermic efficiency.

The invention will appear more clearly from the following detailed description when taken in connection with the accompanying drawings, showing by way of example preferred embodiments of the inventive idea.

In the drawings:

Figure 1 is a horizontal section with parts broken away, of a tank furnace constructed in accordance with the principles of the present invention, the electrodes being shown in full;

Figure 2 is a vertical longitudinal section of the furnace shown in Figure 1;

Figure 3 is a horizontal section, with parts broken away, of a somewhat differently constructed furnace, the electrodes being shown in full;

Figure 4 is a vertical section through the furnace shown in Figure 3;

Figure 5 is a horizontal section above the glass level of a furnace embodying another form of the invention;

Figure 6 is a vertical section through the furnace shown in Figure 5;

Figure 7 is a horizontal section, with parts broken away, of still another form of furnace, the electrodes being shown in full; and Fig. 8 is a vertical section through the furnace shown in Fig. 7.

Fig. 9 is a horizontal section through a different furnace.

The furnace 10 shown in Figures 1 and 2 comprises charging orifices 11 and a glass withdrawing orifice or opening 12. The furnace comprises a melting or fusing portion 13 of a comparatively large width, a narrower fining portion 14, and an intermediate portion 15.

The fusing portion 13 of the furnace includes two electrodes 16 and 17 which extend across the entire furnace and which may be connected by conductors 18 and 19 to two different poles of a source of electrical energy not shown in the drawings. A second pair of electrodes 20 and 21 is situated within the fining portion 14 of the furnace.

The electrical current flowing through the glass mass between the electrodes 16 and 17 produces a hot zone 22. The current between the electrodes 20 and 21 of the fining part of the furnace produces another hot zone 23. These zones are designated by broken lines in the drawings.

As shown in Figure 2, the electrodes 16 and 17 are situated substantially close to the surface of the glass mass 24, while the electrodes 20, 21 are situated more deeply within the glass mass.

In operation, the raw materials are introduced into the furnace through the charging openings 11 and at first constitute a partly formed glass mass 24a floating on the surface of the glass mass 24. The hot zone 22 in the melting portion 13 of the furnace extends to the surface of the glass mass 24, so that the partly formed comparatively opaque glass 24a cannot leave the melting portion 13 of the furnace without passing through the hot zone 22.

As shown in Figure 1, the furnace 10 is considerably wider in the melting portion 13 than in the fining portion 14, thus permitting a much wider hot zone 22 in the melting portion 13. Thus, the partly formed glass 24a can pass through the hot zone 22 and the portion 15 at a speed slow enough to give time for its complete formation and treatment, while the output of the furnace as a whole and of the fining portion 14 is not restricted by reason of the slow speed.

After the glass mass has passed the zone 22 and has been melted therein, it flows through the intermediate portion 15 of the furnace and reaches the hot zone 23 situated in the fining portion of the furnace. Owing to the greater fluidity and transparency of the glass mass at this part of the furnace, the hot zone 23 has a greater range of action than the hot zone 22. The finished glass is removed through the opening 12.

Other hot zones may be produced by other electrodes placed along the length of the furnace if required for the melting or the fining operations.

Each of the electrodes 16 and 17 may consist of several parts, as shown in Figure 1.

The furnace 30 shown in Figures 3 and 4 comprises a single electrode 31 situated in the wide melting portion 32 of the furnace, while another shorter electrode 33 is situated in the narrower fining portion 34 of the furnace. The electrodes 31 and 33 are of opposite polarity and are of substantially small diameter, as compared with the cross-section of the glass mass 24 flowing through the intermediate portion 35 of the furnace.

The electrical current supplied to the electrode 31 through the wire 36 flows through the glass mass 24 in the intermediate portion 35 of the furnace to the electrode 33 and the conductor 37. Due to the fact that each electrode has a comparatively small surface area which is in contact with the glass mass, the density of the electrical current is quite great close to each electrode and thus hot zones 38 and 39 are produced around the electrodes 31 and 33, respectively.

In this construction, also, the electrode 31 and its hot zone 38 are much wider, measured transversely of the furnace, than the electrode 33 and its hot zone 39.

The raw materials are introduced into the furnace through the charging openings 40 and in the course of their flow from that end of the furnace to the withdrawing end 41, they are melted in the portion 32 of the furnace by the action of the heating zone 38 and are fined in the portion 34 of the furnace by the action of the hot zone 39.

The furnace 50 shown in Figures 5 and 6 has two electrodes of opposite polarity, each of the electrodes being constituted by a plurality of substantially vertical electrode elements. The electrode in the melting portion 51 of the furnace is constituted by a plurality of electrode elements 52 which are situated vertically one next to the other and which are, preferably, electrically connected to each other and to a pole of a source of electrical energy 52a. The electrode elements 52 are placed so close together that the hot zone 53 around each electrode element extends to the hot zones around the adjacent electrode elements, so that a single horizontal hot zone is formed which extends across the entire width of the furnace substantially close to the surface of the glass mass 24. At the same time, the spaces between the electrode elements 52 permit the passage of the glass mass 24 flowing from the charging orifice 54 of the furnace to its delivery end 55.

A plurality of vertical electrode elements 56 are situated in the fining portion 57 of the furnace. Each electrode element 56 forms a hot zone 58 which adjoins the hot zone formed by the next element 56, so that a single horizontal hot zone is constituted which extends across the entire width of the furnace and is used for the fining of the glass mass.

As in the previously described furnaces, the hot zone in the melting portion 51 of the furnace is much wider than the hot zone in the fining portion 57 of the furnace.

As shown in Figure 6, the electrode elements 52 penetrate to a relatively small depth into the glass mass, while the electrode elements 56 penetrate much more deeply into the glass mass.

It is possible to vary the amount of electrical energy expended in the glass mass at any point by varying the depth to which any of the electrode elements 52 or 56 are dipped into the glass mass 24.

While the electrode elements 56 are situated substantially close to one another to permit the formation of a single hot zone extending across the entire width of the furnace, the glass mass 24 flowing to the delivery end 55 of the furnace can easily pass between the electrode elements.

The furnace 60 shown in Figures 7 and 8 of the drawings comprises a melting portion which is divided into two branches 61 and 62. The branch 61 has a charging orifice 63 while the branch 62 has a charging orifice 64. The glass masses from the two branches come together in the portion 65 of the furnace and then passes through the fining portion 66, leaving the furnace at the discharge end 67.

The portion 61 of the furnace 60 carries an electrode 68 which extends across the entire width of this portion of the furnace and forms a hot zone 69 surrounding the electrode. A similar electrode 70 is situated across the portion 62 of the furnace and forms a hot zone 71. A third electrode 72 extends across the fining portion 66 of the furnace 60.

The electrodes 69, 70, and 72 may be connected to different phases of a three-phase current whereby more energy is expended in the melting portions 61 and 62 than in the fining portion 61, such a distribution of energy being in general desirable. However, the electrodes 68 and 70 may be connected to one pole of a source of electrical energy and the electrode 72 may be connected to its opposite pole.

It is apparent that the combined length of the hot zones 69 and 71 is materially greater than that of the hot zone 73 surrounding the electrode 72. This construction has the advantage that each of the electrodes 68 and 70 is short and more suitable mechanically for large furnaces. Furthermore, the glass masses flowing from each of the two narrow branches 61 and 62 are more uniform than the glass mass in a wide furnace in which the melting action may vary across the width of the furnace. Also, the glass masses from the two branches 61 and 62 when mixing in the portion 65 of the furnace, produce a more homogeneous glass.

For a single phase supply, each of the single electrodes 68, 70, and 72 may be replaced by a pair of electrodes 68, 68', 70, 70' and 72, 72', respectively, (Fig. 9), the two electrodes of each pair being of opposed polarity, as in the construction shown in Figure 1. Any suitable number of branches 81 (Fig. 9) may constitute the melting portion of the furnace 82.

It has been found in practice that good results may be obtained by giving the hot zone or zones in the melting portion of a furnace a total length which is approximately one and one-half times the length of the hot zone in the fining portion of that furnace.

It is apparent that the specific illustrations shown and described above have been given by way of illustration and not by way of limitation, and that the structures and methods above described are subject to wide variation and modification without departing from the scope or intent of the invention, all of which variations and modifications are to be included within the scope of the present invention.

What is claimed is:

1. In a tank furnace for making glass wherein a glass mass is maintained at a substantially constant level and the materials to be treated are introduced at one portion of the tank, the glass mass is melted and fined in different portions of the tank and glass in the finished state is removed from another portion of the tank, the combination therewith of a plurality of rod-like electrodes situated within the tank and extending between opposite walls thereof, the glass mass being heated by the passage through it of a current from said electrodes creating hot zones extending substantially across the width of the furnace, said electrodes comprising at least one electrode which is situated in the melting portion of the furnace wholly below but close to the surface of the glass mass and forms a hot zone extending across the width of the furnace, and at least one other electrode situated in the fining portion of the furnace further below the surface of the mass than the electrode in said melting portion and forming a hot zone extending across the width of the furnace, the length of the hot zone in the melting portion of the furnace as measured across the width of the furnace being materially greater than that of the hot zone in the fining portion of the furnace.

2. In a tank furnace for making glass wherein a glass mass is maintained at a substantially constant level and the materials to be treated are introduced at one end of the tank, the glass mass is melted and fined in different portions of the tank and glass in the finished state is removed from the opposite end of the tank, the combination therewith of a plurality of electrodes situated in the path of the glass mass flow, said electrodes having relatively small surface areas in contact with the glass mass to provide hot zones extending across the width of the furnace, when an electric current is passed between the electrodes and through the glass mass, said electrodes comprising an electrode which is situated in the melting portion of the furnace and forms a hot zone extending across the width of the furnace and situated relatively close to the level of the glass mass in the furnace, and another electrode situated in the fining portion of the furnace and forming a hot zone extending across the width of the furnace, the length of the hot zone in the melting portion of the furnace as measured across the width of the furnace being materially greater than that of the hot zone in the fining portion of the furnace, the two electrodes in the fining and melting portions of the furnace being of opposite polarities and extending transversely of the furnace across substantially the entire width thereof and in the path of flow of the glass mass.

3. An electric tank furnace for the melting and fining of a glass mass, said furnace comprising a melting portion consisting of a plurality of branches, each of said branches having a charging orifice formed therein, an intermediate portion communicating with said branches, whereby glass masses in said branches are united in said intermediate portion, and a fining portion communicating with said intermediate portion; at least one separate electrode in each of said branches, said electrode, being immersed in the glass mass close to the surface thereof and being adapted to form a hot zone close to the surface of the glass mass in the branch, said electrode extending transversely of the furnace across substantially the entire width of the branch, and at least one electrode in said fining portion, the last-mentioned electrode being immersed in the glass mass and being adapted to form a hot zone in the glass mass and extending transversely of the furnace across substantially the entire width of the fining portion, the combined length of the hot zones in said branches measured across the width of the branches being materially greater than that of the hot zone in the fining portion of the furnace.

4. An electric tank furnace for the melting and fining of a glass mass, said furnace comprising a melting portion consisting of at least two branches, each of said branches having a charging orifice formed therein, an intermediate portion communicating with said branches, whereby glass masses in said branches are united in said intermediate portion, and a fining portion communicating with said intermediate portion; at least one separate electrode in each of said branches, said electrode extending across substantially the entire width of the branch in the glass mass and having a relatively small surface area in contact with the glass mass to form a hot zone close to the electrode, an electrode in said fining portion, the last-mentioned electrode extending substantially across the entire width of said fining portion in the glass mass and having a relatively small surface area in contact with the glass mass to form a hot zone close to the electrode, the combined length of the hot zones in said branches measured across the width of the branches being materially greater than that of the hot zone in the fining portion of the furnace, and means connecting each of said electrodes to different poles of a polyphase current supply.

5. An electric tank furnace for the melting and fining of a glass mass, said furnace comprising a melting portion consisting of at least two branches, each of said branches having a charging orifice formed therein, an intermediate portion communicating with said branches, whereby glass masses in said branches are united in said intermediate portion, and a fining portion communicating with said intermediate portion; a separate pair of electrodes of opposite polarities in each of said branches, said pair of electrodes being adapted to form a hot zone close to the surface of the glass mass in the branch and extending across substantially the entire width of the branch in the glass mass, and a pair of electrodes in said fining portion, the last-mentioned pair of electrodes being adapted to form a hot zone in the glass mass and extending substantially across the entire width of the fining portion in the glass mass, the combined length of the hot zones in said branches measured across the width of the branches being greater than that of the hot zone in the fining portion of the furnace.

6. In a glass making furnace for the continuous production of glass comprising a container having a melting portion and at least one inlet for glass making materials adjacent one end thereof, a refining portion intermediate the ends thereof, and an outlet for the removal of glass adjacent the other end thereof, the width of said melting portion being at least one and one-half times as great as the width of said refining portion, electrodes in said melting and refining portions extending across substantially the entire width thereof and immersed in the glass mass between said inlet and said outlet, the electrodes in the melting portion being substantially close to the free surface of the glass mass and nearer to said surface than the electrodes in the refining portion of the container, and means for connecting said electrodes to different terminals of a source of electrical energy to cause the flow of electrical current through said glass mass between said electrodes, the latter being so constructed and mounted in the container as to produce higher temperatures in the zones immediately surrounding the same than in other parts of the glass mass, the total melting capacity of the furnace being substantially equal to the total refining capacity thereof.

7. In a furnace for the continuous production of glass, a container for the glass mass having at least one inlet adjacent one end thereof for the insertion of glass making materials and an outlet adjacent the other end thereof for removal of glass, the portion of said container wherein said materials are melted being materially wider than the portion of the container wherein the molten mass becomes refined, a plurality of electrodes immersed in the molten mass in said melting and refining portions of the container between said inlet and outlet, the electrodes in the melting portion being substantially close to the free surface of the molten mass and nearer to the surface than the electrodes in the refining portion, each of said electrodes extending across substantially the entire width of the glass mass, and means for connecting said electrodes to a source of electrical energy whereby electrical current is caused to flow through said mass between said electrodes, the melting capacity of said furnace being substantially equal to the refining capacity thereof.

8. A glass making furnace for the continuous production of glass wherein the upper surface of the glass mass is maintained at a substantially constant level comprising a container having a melting portion and at least one inlet for glass making materials adjacent one end thereof, a refining portion intermediate the ends thereof and an outlet for the removal of glass adjacent the other end thereof, the width of said melting portion being substantially greater than the width of said refining portion, a source of electrical energy, a pair of electrodes in said melting portion mounted relatively close together near the free surface of the glass mass and connected to opposite terminals of said source of electrical energy, a pair of electrodes in said refining portion mounted relatively close together at a greater distance from the free surface of the glass mass than said first-named pair of electrodes and connected to opposite terminals of said source of electrical energy, each of said electrodes being mounted in said container between the point of insertion of the glass making materials and the point of removal of the glass and wholly below the surface of the glass mass so that the mass may flow above and below the same, all of said electrodes also extending across substantially the entire width of said furnace, the surface area of each of said electrodes in contact with the glass mass being such that a high intensity heat zone is formed around each of said pairs of electrodes, the temperatures of the glass mass in said zones being higher than in any other portions of the glass mass.

9. A glass making furnace for the continuous production of glass wherein the upper surface of the glass is maintained at a substantially constant level comprising a container having at least one inlet adjacent one end thereof for the insertion of glass making materials, a portion adjacent said inlet wherein said materials are melted, a central portion in which the molten glass mass is refined and an outlet for the removal of refined glass adjacent the other end thereof, the width of the portion of the container in which said materials are melted being substantially greater than the width of the portion of the container in which said glass mass is refined, rod-like electrodes in said melting and refining portions extending across substantially the entire width thereof and immersed in and surrounded by the glass mass between said inlet and said outlet, the electrodes in said melting portion of the container being relatively close to the free surface of the glass mass and those in the refining portion of said container being immersed in said mass to a greater depth, and means for connecting said electrodes to different terminals of a source of electrical energy, the surface areas of said electrodes being sufficiently small so that the glass mass in zones immediately surrounding said electrodes is heated to higher temperatures than any other portions of the glass mass.

10. In a glass making furnace for the continuous production of glass comprising a container having a melting portion and at least one inlet for glass making materials adjacent one end thereof, a refining portion intermediate the ends thereof and an outlet for the removal of glass adjacent the other end thereof, electrodes in said melting and refining portions extending across substantially the entire width thereof and immersed in the glass mass between said inlet and said outlet, at least one electrode in the melting portion being substantially close to the free surface of the glass mass and nearer to said surface than any electrode in the refining portion of the container, and means for connecting said electrodes to different terminals of a source of electrical energy to cause the flow of electrical current through said glass mass between said electrodes, the latter being so constructed and mounted in the container as to produce higher temperatures in the zones adjacent thereto than in other parts of the glass mass, the high temperature zone in the melting portion being at least one and one-half times longer as measured transversely of the furnace than the high temperature zone in the refining portion, and the total melting capacity of the furnace being substantially equal to the total refining capacity thereof.

11. In a furnace for the continuous production of glass, a container for the glass mass having at least one inlet adjacent one end thereof for the insertion of glass making materials and an outlet adjacent the other end thereof for the removal of glass, a plurality of electrodes immersed in the glass mass between said inlet and outlet and in the portions of the container wherein said materials are melted and refined, at least one electrode in the melting portion being substantially close to the free surface of the molten mass and nearer to said surface than any electrode in the refining portion, each of said electrodes extending across substantially the entire width of the glass mass, and means for connecting said electrodes to a source of electrical energy whereby electrical current is caused to flow through said mass between said electrodes creating high temperature zones adjacent said electrodes, the high temperature zone in the melting portion being materially longer as measured transversely of the container than the high temperature zone in the refining portion, the melting capacity of said furnace being substantially equal to the refining capacity thereof.

12. A glass making furnace for the continuous production of glass wherein the upper surface of the glass mass is maintained at a substantially constant level comprising a container having a melting portion and at least one inlet for glass making materials adjacent one end thereof, a refining portion intermediate the ends thereof, and an outlet for the removal of glass adjacent the other end thereof, a source of electrical energy, at least one pair of electrodes in said melting portion mounted relatively close together near the free surface of the glass mass and connected to opposite terminals of said source of electrical energy, a pair of electrodes in said refining portion mounted relatively close together and connected to opposite terminals of said source of electrical energy, each of said electrodes being mounted in said container between the point of insertion of the glass making materials and the point of removal of the glass and wholly below the surface of the glass mass so that the mass may flow above and below the same, all of said electrodes also extending across substantially the entire width of said container whereby a high intensity heat zone is formed between the electrodes of each of said pairs, the temperatures of the glass mass in said zones being higher than in any other portions of the glass mass, and the heat zone in said melting portion being materially longer as measured across the width of the container than that of the heat zone in the refining portion.

13. A glass making furnace adapted for the continuous production of glass wherein the upper surface of the glass is maintained at a substantially constant level comprising a container having at least one inlet adjacent one end thereof for the insertion of glass making materials, a portion adjacent said inlet wherein said materials are melted, a central portion in which the molten glass mass is refined and an outlet for the removal of refined glass adjacent the other end thereof, rod-like electrodes in the portions of the container in which said materials are melted and refined extending across substantially the entire width of the container and immersed in and surrounded by the glass mass between said inlet and said outlet, at least one electrode being relatively close to the free surface of the glass mass in the melting portion of the container and nearer to said surface than any electrode in the refining portion of said container, and means for connecting said electrodes to different terminals of a source of electrical energy, said electrodes being so constructed and mounted in the container that the glass mass in zones immediately adjacent said electrodes is heated to higher temperatures than any other portions of the glass mass, said zone of higher temperature in the melting portion being longer as measured across the width of the container than the length of the zone of higher temperatures in the refining portion of the container.

14. A glass making furnace adapted for the continuous production of glass wherein the upper surface of the molten glass mass is maintained at a substantially constant level comprising a container having at least one inlet adjacent one end thereof for the insertion of glass making materials, a portion adjacent said inlet wherein said materials are melted, a central portion in which the molten glass mass is refined and at least one outlet for the removal of refined glass adjacent the other end thereof, the width of the portion of the container in which said materials are melted being substantially greater than the width of the portion thereof in which the glass mass is refined, and means for heating the glass mass comprising rod-like electrodes in said melting and refining portions creating hot zones extending across substantially the entire width thereof and being immersed in and surrounded by the glass mass between said inlet and said outlet, at least one of said electrodes being near the free surface of the glass mass in said melting portion of the container, a source of electrical energy and means for connecting said electrodes to different terminals of said source, said electrodes being so constructed and mounted in said container that the glass mass in zones adjacent said electrodes and coextensive therewith is heated to higher temperatures than any other portions of the glass mass.

15. A glass making furnace adapted for the continuous production of glass wherein the upper surface of the molten glass mass is maintained at a substantially constant level comprising a container having at least one inlet adjacent one end thereof for the insertion of glass making materials, a portion adjacent said inlet wherein said materials are melted, a central portion in which the molten glass mass is refined and at least one outlet for the removal of refined glass adjacent the other end thereof, and means for heating the glass mass comprising electrodes constituted by rod-like elements in said melting and refining portions, said electrodes creating hot zones extending across substantially the entire width of said melting and refining portions and being immersed in the glass mass between said inlet and said outlet, at least one of said electrodes being relatively close to the free surface of the glass mass in the melting portion of the container, a source of electrical energy and means for connecting said electrodes to different terminals of said source, at least one electrode in said melting portion being connected to one terminal of said source and at least one electrode in said refining portion being connected to the other terminal of said source, said electrodes being so constructed and mounted in said container as to create hot zones in the glass mass adjacent said electrodes, in which zones the temperatures of the glass mass are higher than in any other portions of the glass mass, the length of the hot zone in the melting portion of the container as measured across the width of the furnace being materially longer than that of the hot zone in the refining portion.

16. In a tank furnace for making glass wherein a glass mass is maintained at a substantially constant level and materials to be treated are introduced at one portion of the tank, the glass is melted and fined in different portions of the tank, and glass in the finished state is removed from another portion of the tank, the combination therewith of a plurality of elongated electrodes situated within the tank and extending between opposite walls thereof, a source of electrical energy, means connecting said electrodes to said source, the glass mass being heated by the passage through it of electrical current from said electrodes creating hot zones extending substantially across the entire width of the tank adjacent said electrodes, the latter comprising at least one electrode which is situated in the melting portion of the tank wholly below but close to the surface of the glass mass and between the point of introduction of said materials and the portion from which finished glass is removed and at least one electrode in the fining portion of the tank, the length of the hot zone thus created in the melting portion of the tank being materially longer as measured across the width of the tank than the length of the hot zone created in the refining portion as measured across the width of the tank.

17. In a tank furnace for making glass wherein a glass mass is maintained at a substantially constant level and the materials to be treated are introduced at one end of the tank, the glass mass is melted and fined in different portions of the tank and glass in the finished state is removed from the opposite end of the tank, the combination therewith of a plurality of electrodes situated in the path of the glass mass flow between the zone of introduction of the materials to be treated and the zone of removal of glass, a source of electrical energy, means connecting said electrodes to said source whereby the glass mass is heated by the passage through it of electrical current, said electrodes comprising at least one electrode which is situated in the melting portion of the furnace for forming a hot zone adjacent thereto and extending substantially across the entire width of the furnace relatively close to the free surface of the molten mass and at least one electrode in the refining portion of the furnace for forming a hot zone adjacent thereto and extending substantially across the entire width of the furnace, the length of the hot zone thus created in the melting portion of the furnace as measured across the width of the latter being materially greater than that of the hot zone in the refining portion of the furnace, the temperatures of the glass mass in said hot zones being greater than in any other portions of the glass mass.

YVAN PEYCHES.